United States Patent
Eggler et al.

(10) Patent No.: US 12,040,661 B2
(45) Date of Patent: Jul. 16, 2024

(54) ROTOR FOR AN ELECTRIC MACHINE AND ELECTRIC MACHINE HAVING A ROTOR

(71) Applicant: ZF Friedrichshafen AG, Friedrichshafen (DE)

(72) Inventors: Jochen Eggler, Waldburg (DE); Ulrich Kehr, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 98 days.

(21) Appl. No.: 17/569,964

(22) Filed: Jan. 6, 2022

(65) Prior Publication Data

US 2022/0271585 A1 Aug. 25, 2022

(30) Foreign Application Priority Data

Feb. 19, 2021 (DE) ...................... 10 2021 201 603.0

(51) Int. Cl.
*H02K 1/276* (2022.01)
*H02P 6/21* (2016.01)
*H02P 29/66* (2016.01)

(52) U.S. Cl.
CPC ............. *H02K 1/2766* (2013.01); *H02P 6/21* (2016.02); *H02P 29/66* (2016.02)

(58) Field of Classification Search
CPC ...... H02K 1/2766; H02K 11/20; H02K 1/223; H02K 1/276; H02P 6/21; H02P 29/66
USPC ..................................................... 310/156.01
See application file for complete search history.

(56) References Cited

U.S. PATENT DOCUMENTS

| | | | | |
|---|---|---|---|---|
| 5,663,605 A | * | 9/1997 | Evans | H02K 21/04 310/263 |
| 6,011,333 A | * | 1/2000 | Yamaguchi | H02K 7/063 310/40 MM |
| 8,004,128 B2 | * | 8/2011 | Abe | H02K 11/21 310/67 R |
| 8,217,545 B2 | * | 7/2012 | Kawasaki | G01D 5/2046 310/156.08 |

(Continued)

FOREIGN PATENT DOCUMENTS

| | | |
|---|---|---|
| DE | 102006021489 A1 | 11/2007 |
| DE | 102014213446 A1 | 1/2016 |

(Continued)

OTHER PUBLICATIONS

German Office Action 10 2021 201 603.0, dated Jul. 15, 2022. (10 pages).

*Primary Examiner* — Alex W Mok
(74) *Attorney, Agent, or Firm* — Dority & Manning, P.A.

(57) ABSTRACT

A rotor (1) for an electric machine (2) includes a rotor body with multiple poles. Multiple flux barriers (6.1, 6.2, 6.3, 6.4) are formed in the interior of the rotor body. The rotor (1) further includes at least one sensor element (3) configured for detecting at least one condition variable of the rotor (1), a signal processing unit (4) connected to the at least one sensor element (3) and configured for generating measured data from the detected condition variable of the rotor (1) and transmitting the measured data to a control device (5), and at least one induction coil (7) that includes at least one electrical conductor (8), is arranged in at least one flux barrier (6.1) of the rotor (1), and is configured for generating electrical energy from a leakage magnetic field in this flux barrier (6.1).

15 Claims, 3 Drawing Sheets

(56) References Cited

U.S. PATENT DOCUMENTS

| | | | | |
|---|---|---|---|---|
| 8,324,768 B2* | 12/2012 | Nakano | ................ | H02K 29/12 |
| | | | | 310/68 B |
| 8,796,898 B2* | 8/2014 | Hashiba | ................ | H02K 1/223 |
| | | | | 310/182 |
| 9,013,083 B2* | 4/2015 | Morita | ................ | H02K 1/146 |
| | | | | 310/216.069 |
| 9,093,878 B2* | 7/2015 | Huh | ................ | H02K 1/223 |
| 9,484,791 B2* | 11/2016 | Brockerhoff | ............ | H02K 11/35 |
| 9,906,108 B2* | 2/2018 | Huh | ................ | H02K 21/46 |
| 9,935,532 B2* | 4/2018 | Aoyama | ................ | H02K 1/223 |
| 9,941,775 B2* | 4/2018 | Fiseni | ................ | H02K 1/28 |
| 10,256,758 B2* | 4/2019 | Frampton | ................ | H02P 9/04 |
| 10,263,500 B2* | 4/2019 | Woehl-Bruhn | ...... | H02K 1/2766 |
| 10,505,411 B2* | 12/2019 | Gieras | ................ | H02K 21/14 |
| 2010/0207475 A1* | 8/2010 | Kawasaki | ............ | H02K 29/12 |
| | | | | 310/156.01 |
| 2015/0318774 A1* | 11/2015 | Tremelling | ........... | H02K 21/042 |
| | | | | 310/68 B |
| 2018/0262091 A1* | 9/2018 | Gieras | ................ | H02K 11/33 |
| 2019/0222105 A1* | 7/2019 | Yagyu | ................ | H02K 21/029 |

FOREIGN PATENT DOCUMENTS

| | | |
|---|---|---|
| EP | 2378646 A1 | 10/2011 |
| WO | WO 2007/128673 | 11/2007 |

* cited by examiner

ROTOR FOR AN ELECTRIC MACHINE AND ELECTRIC MACHINE HAVING A ROTOR

CROSS-REFERENCE TO RELATED APPLICATION

The present application is related and has right of priority to German Patent Application No. 102021201603.0 filed in the German Patent Office on Feb. 19, 2021, which is incorporated by reference in its entirety for all purposes.

FIELD OF THE INVENTION

The invention relates generally to a rotor for an electric machine. The invention further relates generally to an electric machine having a rotor of this type. The invention also relates generally to a vehicle having an electric machine.

BACKGROUND

For example, DE 10 2006 021 489 A1 discloses an electric machine having a stator and a rotor. The electric machine is designed as a permanent-magnet synchronous machine, wherein the rotor includes a rotor body having permanent magnets arranged in the interior of the rotor body as well as flux barriers. The permanent magnets form poles of the electric machine, wherein at least one flux barrier is arranged in the area of each pole.

In order to be able to optimally operate an electric machine, it is significant, in particular, to determine condition variables of the rotor by sensors and make the condition variables available to a control device of the electric machine. Previously it has been difficult to supply such sensors, which are associated with the rotor of the electric machine and rotate together with the rotor, with sufficient electrical energy.

For example, the continuous power of an electric machine is limited, among other things, by the maximum permissible temperature of the rotor, in particular of the magnets in the case of a permanent-magnet synchronous machine or of the cage of an induction machine. During the operation of the electric machine, the current rotor temperature is generally not known as a measured quantity and is estimated by a temperature model. As a result, an allowance must be made for a safety margin for the maximum temperature, and so the electric machine cannot be optimally operated due to this safety margin. If the maximum temperature is exceeded, there is a risk of the electric machine overheating and becoming damaged.

SUMMARY OF THE INVENTION

Example aspects of the present invention provide a rotor for an electric machine, and an electric machine. In particular, the operation of the electric machine is to be improved and the risk of the electric machine overheating is to be reduced by the rotor. Moreover, the rotor is to be easily and quickly installable.

A rotor according to example aspects of the invention for an electric machine has a rotor body including multiple poles, wherein multiple flux barriers are formed in the interior of the rotor body, the rotor further including at least one sensor element, which is configured for detecting at least one condition variable of the rotor, a signal processing unit connected to the at least one sensor element, which is configured for generating measured data from the detected condition variable of the rotor and transmitting the measured data to a control device, and at least one induction coil, which includes at least one electrical conductor and is arranged in at least one flux barrier of the rotor and is configured for generating electrical energy from a leakage magnetic flux in this flux barrier.

For example, at least one induction coil, which has at least one electrical conductor, is arranged in a single flux barrier of the rotor.

A flux barrier is to be understood as a recess in the rotor, wherein this recess is configured for advantageously influencing the magnetic field. For example, the rotor includes a plurality of axially stacked rotor laminations, which have punched-out portions and, in the condition assembled to form the rotor body, form axial recesses. In particular, at least one recess designed as a flux barrier is arranged in the area of a particular pole of the rotor.

The flux barriers direct the magnetic field at the rotor in such a way that the field lines extend essentially in parallel to the longitudinal direction of the flux barriers, and the field lines do not extend through the flux barriers transversely to the direction of the flux barriers, because the flux barriers represent a barrier for the magnetic flux. In practical applications, however, leakages of the magnetic flux occur, the leakage magnetic flux. In other words, some field lines having a low magnetic flux density extend in the flux barriers. For example, at least one induction coil or multiple induction coils can be arranged in multiple flux barriers of the rotor in order to generate electrical energy via induction from this leakage magnetic flux.

In other words, the rotor of the electric machine includes the at least one sensor element, optionally multiple sensor elements, as well as the signal processing unit and the at least one induction coil including the at least one electrical conductor. In particular, the at least one sensor element, the signal processing unit, and the at least one induction coil are connected to the rotor in a positionally fixed and rotationally fixed manner, i.e., at least arranged thereon, in particular integrated in the rotor. The at least one induction coil is connected to the rotor in a form-locking manner at least in the direction of rotation and the radial direction. In particular, the at least one induction coil is arranged in a flux barrier of the rotor with an exact fit, wherein the induction coil can be axially inserted into the flux barrier for installation.

Preferably, the at least one induction coil is configured for supplying the signal processing unit and/or the at least one sensor element with electrical energy. Consequently, either the signal processing unit is supplied with electrical energy or the at least one sensor element is supplied with electrical energy or both the signal processing unit as well as the at least one sensor element are supplied with electrical energy.

During the operation of the electric machine, it is possible to tap electrical energy via the at least one induction coil, the electrical conductor or electrical conductors of which each extend through one flux barrier of the rotor. When the rotor is rotating, the leakage magnetic flux of a changing magnetic field flows through the at least one induction coil, as the result of which an electric current or a voltage is induced in the at least one induction coil, which is utilized for supplying electrical energy to the at least one sensor element and/or the signal processing device, which are arranged at the rotor in a rotationally fixed manner and rotate together with the rotor. In this way, collecting rings and batteries for the power supply of the components rotating with the rotor can be dispensed with.

The at least one sensor element can be arranged directly at the rotor and, there, immediately detect condition variables of the rotor, in particular a temperature of the rotor, in order to reduce the risk of the electric machine overheating. The at least one sensor element is just as suitable for measuring absolute temperatures as it is for detecting temperature differences. For example, the temperature of the rotor is a condition variable of the rotor. For example, the at least one sensor element is arranged directly at or at least adjacent to the point of origin of the condition variable. A short measuring path between the at least one sensor element and the point of origin of the condition variable increases the measuring accuracy.

Preferably, the energy transmission takes place at least between the at least one induction coil and the element to be supplied with energy by wiring. In one first example embodiment, the induction coil can be connected to the at least one sensor element by wiring. Alternatively, the induction coil can be connected to the signal processing unit by wiring. Alternatively, the induction coil can be arranged on a circuit board together with the signal processing unit. Alternatively, the induction coil can be arranged on a circuit board together with the sensor.

In particular, the signal processing unit is wirelessly connected to the control device for signal transmission and/or data transmission. The at least one sensor element is preferably connected to the signal processing unit via wiring for signal transmission and/or data transmission. For example, the control device is arranged outside the rotor, although within the vehicle.

According to one preferred example embodiment of the invention, at least the signal processing unit is arranged at an end face of the rotor. In particular, the at least one sensor element is arranged at an end face of the rotor. For example, the at least one sensor element is arranged in an area of the rotor that heats up to an extreme extent when the electric machine is loaded. The end-face arrangement at least of the signal processing unit, optionally also of the at least one sensor element, is advantageous, since the properties of the rotor, in particular the electrical and magnetic properties of the electric machine, are not negatively influenced and the signal transmission is simplified. Moreover, the end face of the rotor is particularly readily accessible not only for the installation, but rather also for maintenance, as the result of which the rotor and the elements arranged thereon can be easily and quickly installed.

According to one preferred example embodiment of the invention, the at least one sensor element is integrated in the signal processing unit. Consequently, the at least one sensor element and the signal processing unit form one single component, which is arranged at the rotor.

According to one preferred example embodiment of the invention, the at least one sensor element is arranged in the interior of the rotor. In other words, the at least one sensor element is not arranged on a surface of the rotor, but rather in a recess in the rotor. In particular, the at least one sensor element is arranged in the interior of the rotor in such a way that a point of origin of the condition variable is in close proximity of the sensor element.

According to one preferred example embodiment of the invention, at least one permanent magnet is arranged in the area of each pole of the rotor. Preferably, the at least one permanent magnet has an essentially rectangular cross-sectional area in the area of each pole and extends further in the circumferential direction than in the radial direction. In other words, the particular permanent magnet is wider than the particular permanent magnet is tall, wherein the axial length essentially corresponds to the rotor length. The permanent magnet can be divided into sub-magnets in the axial direction or the radial direction.

According to one preferred example embodiment of the invention, at least one flux barrier is formed in the area of each pole of the rotor. In particular, the flux barrier is formed adjacent to the particular permanent magnet in the circumferential direction. Preferably, the particular flux barrier extends in the direction of an outer circumference of the rotor. For example, two flux barriers are formed at one permanent magnet in each case, wherein one of the two flux barriers is arranged on each side in the circumferential direction.

Preferably, the rotor has at least two poles, preferably at least six poles, wherein each pole has at least one permanent magnet, preferably two permanent magnets, and at least two flux barriers, preferably four flux barriers.

According to one preferred example embodiment of the invention, the at least one conductor of the at least one induction coil extends in a first direction in a first area of the flux barrier and, in a second area of the flux barrier, extends back from the first direction, i.e., in a second direction that is opposite the first direction. In particular, the first direction is the longitudinal direction of the rotor. Multiple forward-conductor sections and multiple return-conductor sections are provided as a function of the number of windings of the induction coil, wherein the more windings an induction coil has, the greater is the amount of energy that can be generated. In other words, the at least one conductor of the at least one induction coil is designed in such a way as if the at least one conductor were wound around an inner core, wherein merely empty space or air space, rather than a core, is located radially within the induction coil. For example, the electrical conductor is wound around a core and, before the insertion into the flux barrier, the core is removed. Consequently, this core is utilized for shaping the induction coil before installation. Preferably, the first area of the flux barrier is located at a first end of the flux barrier, which is arranged radially farther outward than a second area of the flux barrier, wherein the second area of the flux barrier is arranged at a second end of the flux barrier.

According to one preferred example embodiment of the invention, the at least one conductor of the at least one induction coil is wound around a carrier. A carrier is to be understood as an element that is arranged radially within the particular induction coil. For example, the carrier is wound around multiple times by the conductor and is arranged in the flux barrier. In particular, the carrier forms a coil core, which remains in the flux barrier together with the induction coil.

According to one preferred example embodiment of the invention, the carrier is formed from a non-magnetizable material. For example, the carrier is formed from a polymer material, a ceramic, a glass, and/or a resin. For example, the carrier is formed from a fiber-reinforced and non-magnetizable material. As a result, the function of the flux barrier as a barrier for the magnetic flux is maintained, wherein only leakage fields can flow through the flux barrier.

According to one preferred example embodiment of the invention, the at least one conductor of the at least one induction coil is at least partially fixed with a varnish. A varnish is to be understood as a liquid material that is suitable for wetting the surface of the conductor and, after drying, curing in such a way that a resistance to deformation of the conductor wetted with varnish is increased. In other words, the varnish is utilized for rigidly fixing at least portions of the induction coil, i.e., for increasing the resistance to deformation thereof, in such a way that the imparted shape of the induction coil is maintained during the operation of the electric machine, also at high rotational speeds of the rotor. In particular, the entire induction coil is fixed by varnish. In particular, the varnish is designed to be non-magnetizable and electrically non-conductive.

According to one preferred example embodiment of the invention, the at least one conductor of the at least one induction coil is at least partially fixed with an encapsulation. An encapsulation is to be understood as a viscous mass that is suitable for accommodating the conductor and embedding the conductor therein, wherein the fixation of the conductor in the encapsulation takes place after the encapsulation has dried and cured. In other words, the encapsulation is utilized for rigidly fixing at least portions of the induction coil, i.e., in particular embedding at least portions of the induction coil therein, in such a way that the imparted shape of the induction coil is maintained during the operation of the electric machine, also at high rotational speeds of the rotor. For example, the entire induction coil is embedded and fixed in an encapsulation. In particular, the encapsulation is designed to be non-magnetizable and electrically non-conductive.

According to one preferred example embodiment of the invention, the at least one conductor of the at least one induction coil is part of a printed circuit board. Such a printed circuit board is also known as a PCB.

An electric machine according to example aspects of the invention includes a control device for the open-loop control of the electric machine as well as a stator and a rotor according to example aspects of the invention. An air gap is formed between the stator and the rotor. The control device is preferably arranged in the vehicle and is utilized for the open-loop and closed-loop control of the electric machine.

Example aspects of the invention also relate to a vehicle having an electric machine according to example aspects of the invention. In particular, the vehicle is designed as a motor vehicle, for example, a passenger car, wherein the electric machine is configured as a prime mover of the vehicle in order to at least partially or completely electrically drive the vehicle. Consequently, the vehicle is preferably designed as a hybrid vehicle or as an electric vehicle.

BRIEF DESCRIPTION OF THE DRAWINGS

Multiple preferred example embodiments of the invention are explained in greater detail in the following with reference to the drawings, wherein identical elements are labeled with the same reference character, wherein.

DETAILED DESCRIPTION

Figure 1:
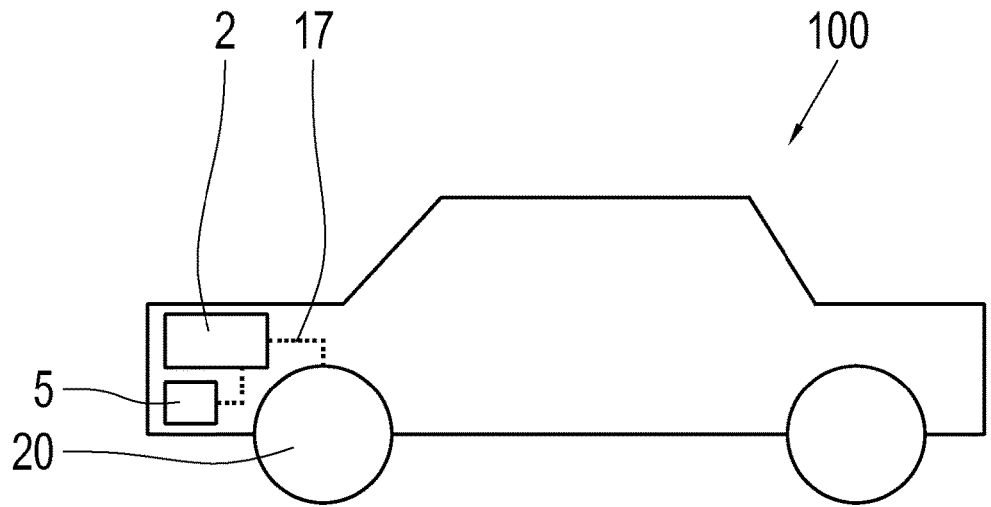
FIG. 1 shows a highly simplified schematic of a vehicle including an electric machine according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

According to FIG. 1, a vehicle 100 includes an electric machine 2 according to example aspects of the invention, which is configured for driving the vehicle 100. For this purpose, the electric machine 2 is drivingly connected, for example, via shafts 17 and, optionally, via further components, to driving wheels 20 of the vehicle 100. Moreover, the electric machine 2 is actuated and operated by a control device 5, which is arranged in the vehicle 100. In particular, the control device 5 is utilized for protecting the electric machine 2 against overheating during the operation, in that the maximum power of the electric machine 2 is adapted, in particular to a currently measured temperature of the rotor 1. For this purpose, the control device 5 is connected to the electric machine 2 in a signal-transmitting manner.

Figure 2:
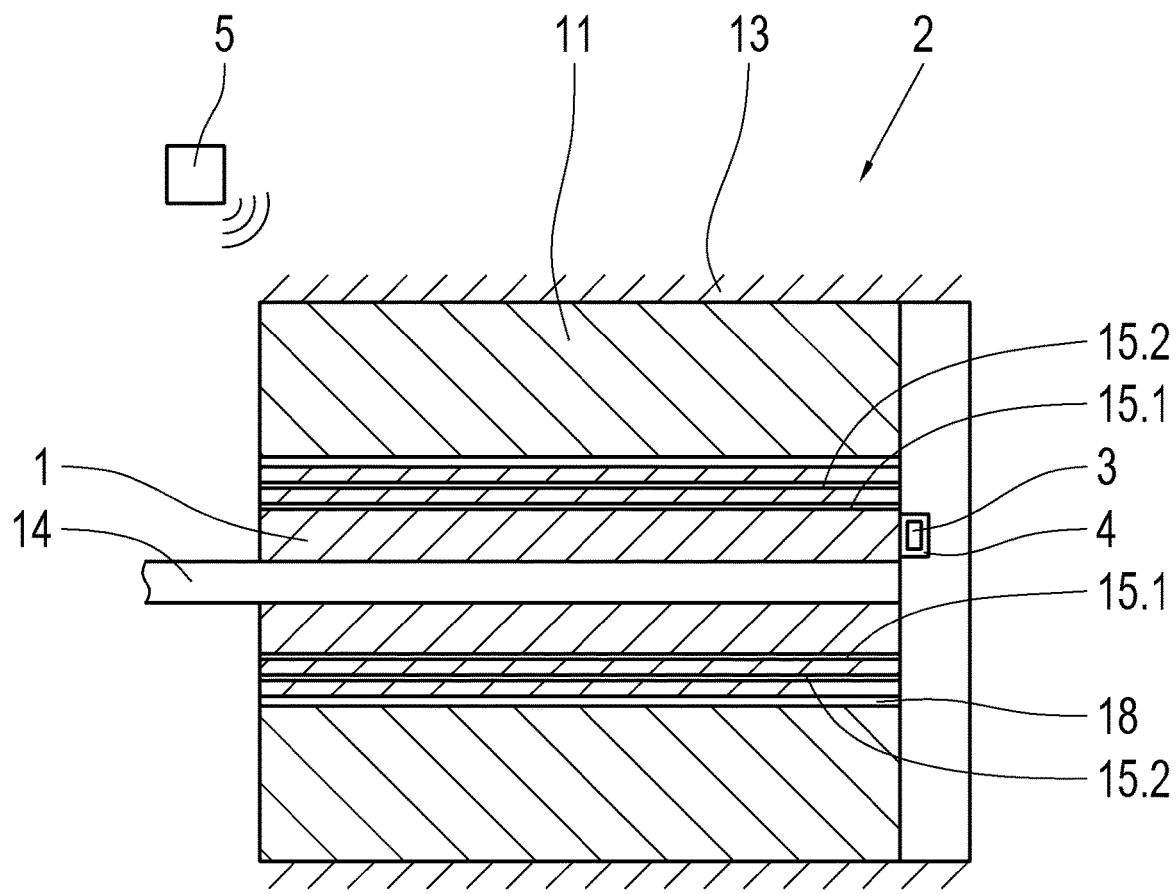
FIG. 2 shows a highly simplified diagrammatic longitudinal sectional representation of the electric machine according to example aspects of the invention including a stator and a rotor.

FIG. 2 shows the electric machine 2, which includes the control device 5 for the open-loop control of the electric machine 2, and a stator 11 and a rotor 1. An air gap 18 is formed between the stator 11 and the rotor 1. The rotor 1 is rotationally fixed to a rotor shaft 14. In the housing 13 of the electric machine 2, a signal processing unit 4 including a sensor element 3 is arranged on an end face of the rotor 1. The at least one sensor element 3 is integrated in the signal processing unit 4. Alternatively, the sensor element 3 can be arranged in the interior of the rotor 1. In the present case, the longitudinal section extends through first and second permanent magnets 15.1, 15.2, which are arranged in the rotor body of the rotor 1.

Figure 3:
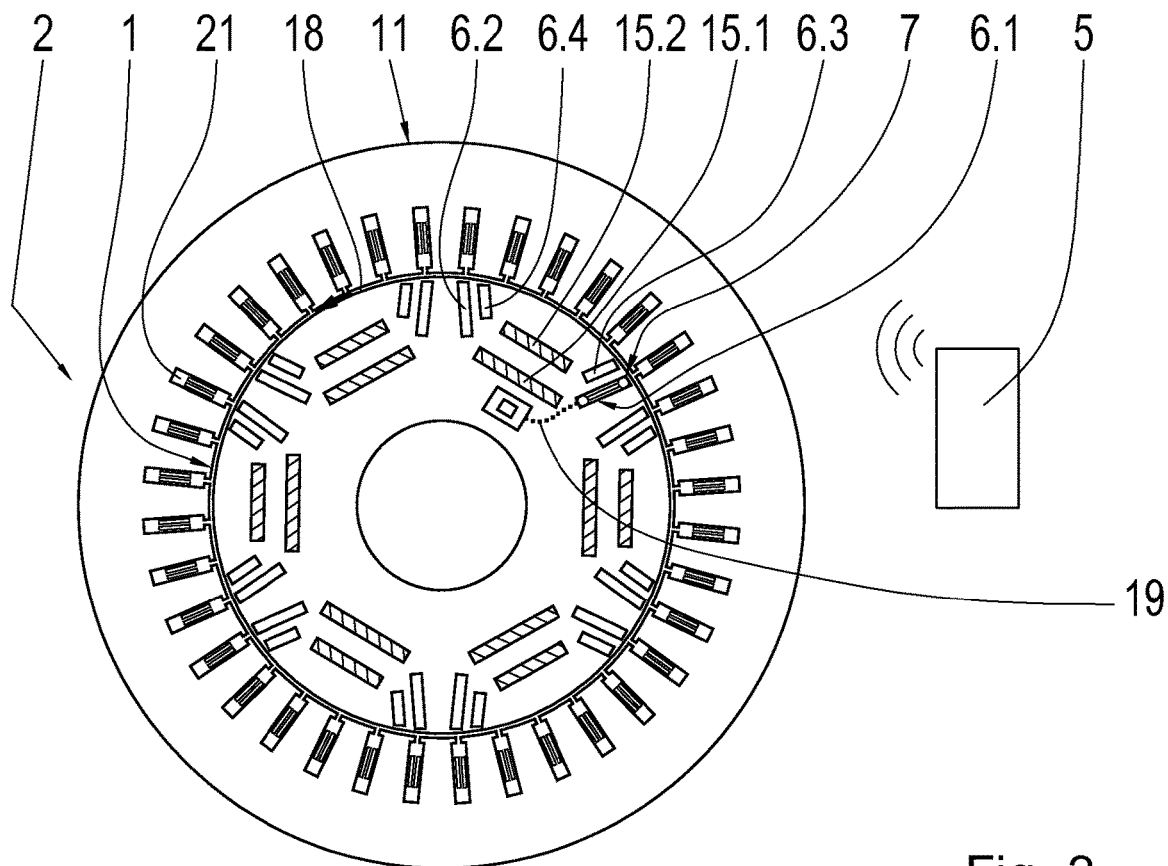
FIG. 3 shows a highly simplified diagrammatic cross-sectional representation of the electric machine according to example aspects of the invention, according to FIG. 2.

FIG. 3 shows the electric machine 2 in a cross-section. The rotor 1 is rotatably arranged in the interior of the stator 11, wherein an air gap 18 is formed between the stator 11 and the rotor 1. The stator 11 has a stator body designed as a stator laminated core as well as multiple coils 21 accommodated by the stator body. The rotor 1 has a rotor body designed as a rotor laminated core and multiple first and second permanent magnets 15.1, 15.2 arranged in the interior of the rotor body. The permanent magnets 15.1, 15.2 arranged in the interior of the rotor laminated core are also referred to as buried permanent magnets. These permanent magnets 15.1, 15.2 form six poles in the present case. A first and a second permanent magnet 15.1, 15.2 radially spaced apart from one another as well as a first, second, third, and fourth flux barrier 6.1, 6.2, 6.3, 6.4 are arranged in the area of each pole. The flux barriers 6.1 and 6.3 as well as 6.2 and 6.4 are also arranged radially spaced apart from one another. One flux barrier 6.1 and 6.2 as well as 6.3 and 6.4 is arranged in the circumferential direction on each side of the permanent magnets 15.1, 15.2, respectively.

In the present case, an induction coil 7 is arranged in a single flux barrier 6.1 of the rotor 1 and is configured for generating electrical energy from the leakage magnetic field in this flux barrier 6.1 in order to supply the sensor element 3 and the signal processing unit 4 with electrical energy. Alternatively, induction coils 7 can be arranged in further flux barriers 6.1, 6.2, 6.3, 6.4 of the rotor 1 in order to generate electrical energy from the leakage magnetic field of the particular flux barrier 6.1, 6.2, 6.3, 6.4. The induction coil 7 is connected via a wiring 19 to the signal processing unit 4 and the sensor element 3 integrated therein. In order to convert the alternating current to direct current and provide the direct current for the sensor element 3, the signal processing unit 4 has, for example, an oscillating circuit (not represented in greater detail, but generally known), a rectifier, and at least one capacitor, alternatively, other energy accumulators.

The sensor element 3 measures a temperature at the rotor 1 as a condition variable of the rotor 1 and transmits this condition variable to the signal processing unit 4. Optionally, multiple sensor elements 3 can be arranged at the rotor 1, which detect, for example, different condition variables of the rotor 1. The signal processing unit 4 generates measured data from the detected condition variables of the rotor 1 and transmits the measured data to the control device 5 installed in the vehicle 100. The control device 5 is connected to the signal processing device 4 at the rotor 1 wirelessly, for example, via radio, and is configured for actuating the electric machine 2 under consideration of demands of a driver as well as operating parameters of the electric machine 2, in particular, operating parameters and/or condition variables of the rotor 1.

With the induction coil 7, it is possible to generate electrical energy during the operation of the electric machine 2. The leakage magnetic field of a changing magnetic field in the flux barrier 6.1 flows through the induction coil 7 during the operation of the electric machine 2, i.e., when the rotor 1 is rotating, as the result of which an electric current or a voltage is induced in the particular induction coil 7, which is utilized for supplying electrical energy to the sensor element 3 and the signal processing unit 4, which are arranged at the rotor 1 in a rotationally fixed manner and rotate together with the rotor 1.

Figure 4:
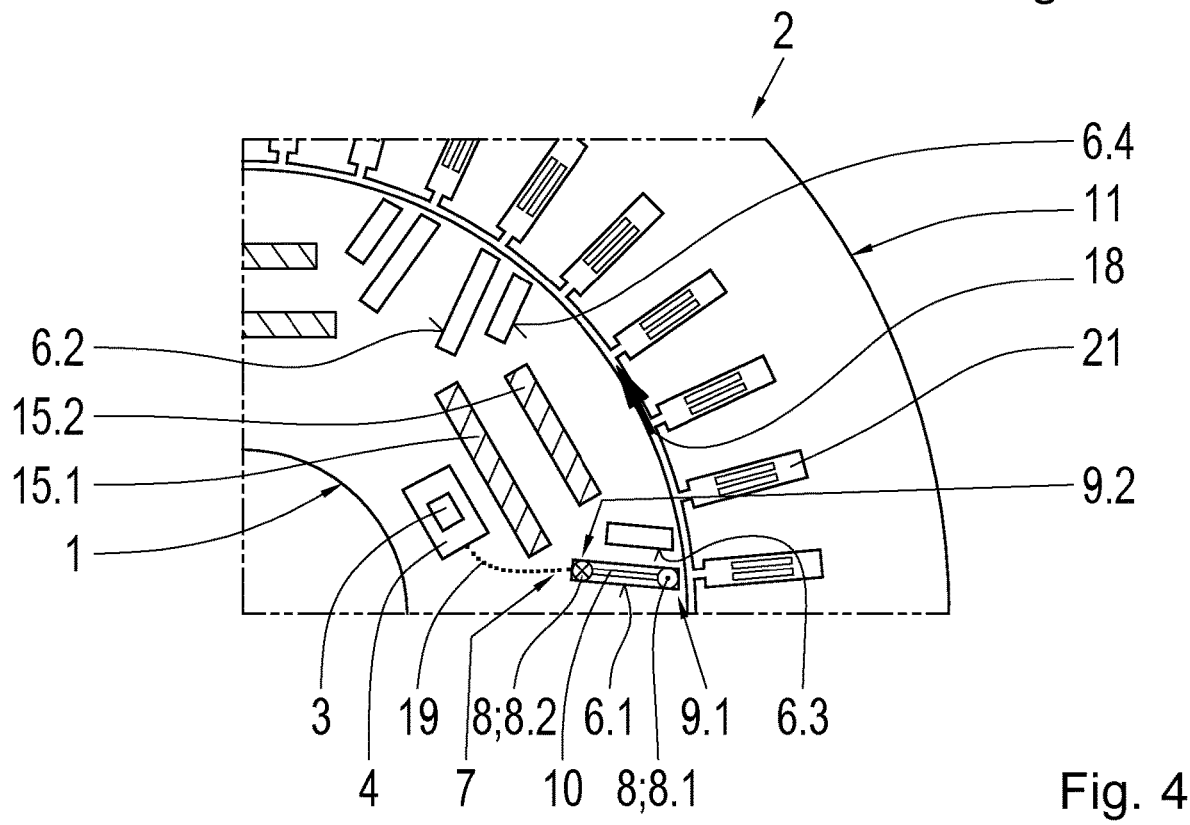
FIG. 4 shows a highly simplified detailed schematic of a section of the electric machine according to example aspects of the invention, according to FIG. 3.

FIG. 4 shows an enlarged section of the electric machine 2 from FIG. 3. A conductor 8 of the induction coil 7 extends in a first direction in a first area 9.1 of the flux barrier 6.1 and, in a second area 9.2 of the flux barrier 6.1, extends back from the first direction. The position of the induction coil 7 in the flux barrier 6.1 and the size of the induction coil 7, i.e., the distance between a forward-conductor section 8.1 and a return-conductor section 8.2 of the conductor 8, are matched to strongly present orders of a harmonic field of the electric machine 2. In the present case, the conductor 8 is wound around a carrier 10, wherein the carrier 10 is formed from a non-magnetizable material, in particular from a polymer material.

Figure 5:
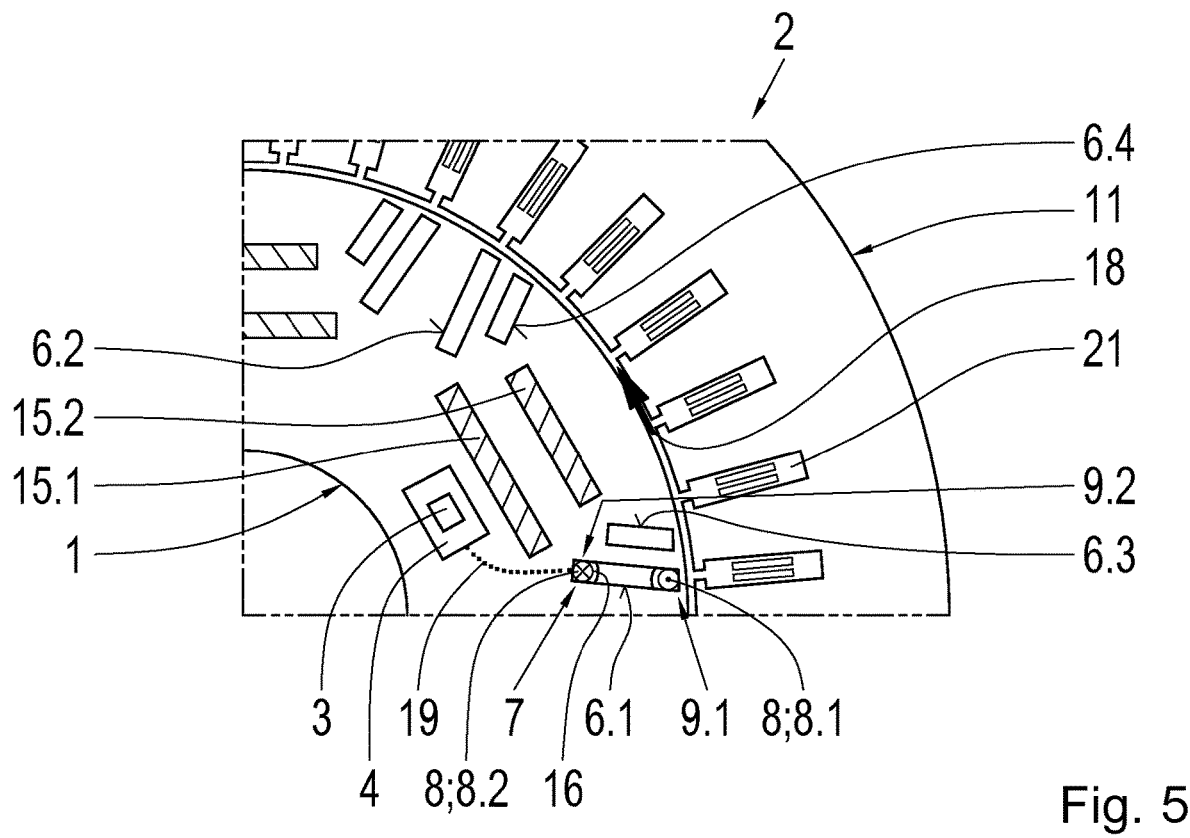
FIG. 5 shows a highly simplified detailed schematic of a section of the electric machine according to example aspects of the invention, according to a second exemplary embodiment.

The example embodiment of the rotor 1 according to FIG. 5 differs from the example embodiment of the rotor 1 according to FIG. 4 only in that the conductor 8 of the induction coil 7 is not wound around a carrier, but rather is at least partially fixed with a varnish 16. The varnish 16 is applied onto the surface of the conductor 8 and, when drying, cures in such a way that a resistance to deformation of the conductor 8 wetted with varnish 16 is increased, and so the imparted shape of the induction coil 7 is maintained, also without a carrier, during the operation of the electric machine 2.

Figure 6:
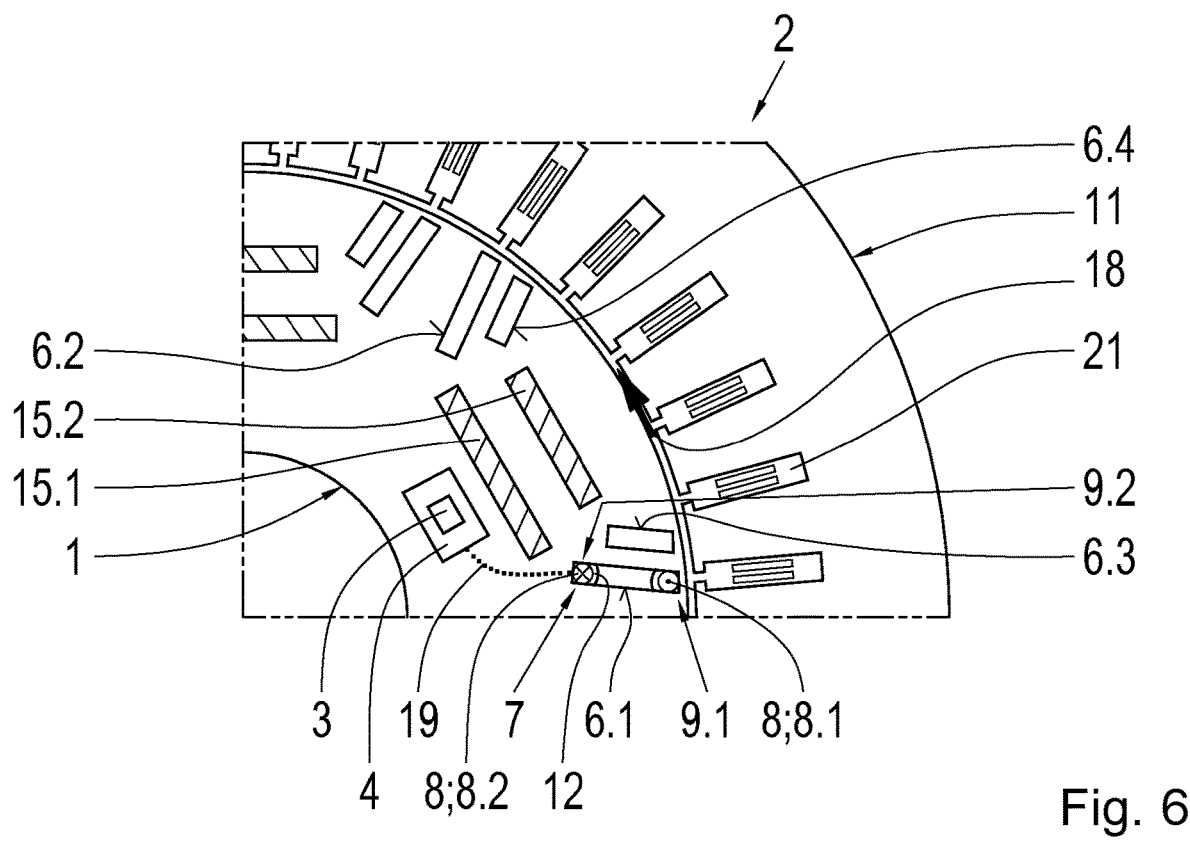
FIG. 6 shows a highly simplified detailed schematic of a section of the electric machine according to example aspects of the invention, according to a third exemplary embodiment.

The example embodiment of the rotor 1 according to FIG. 6 differs from the example embodiment of the rotor 1 according to FIG. 4 only in that the conductor 8 of the induction coil 7 is not wound around a carrier, but rather is at least partially fixed with an encapsulation 12. The conductor 8 is embedded in the viscous encapsulation 12, wherein the encapsulation 12, when drying, cures in such a way that the fixation of the conductor 8 in the encapsulation 12 takes place, and so the imparted shape of the induction coil 7 is maintained during the operation of the electric machine 2. Consequently, the encapsulation 12 performs the function of a carrier.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 rotor
2 electric machine
3 sensor element
4 signal processing unit
5 control device
6.1 flux barrier
6.2 flux barrier
6.3 flux barrier
6.4 flux barrier
7 induction coil
8 electrical conductor
8.1 forward-conductor section
8.2 return-conductor section
9.1 first area
9.2 second area
10 carrier
11 stator
12 encapsulation
13 housing
14 rotor shaft
15.1 first permanent magnet
15.2 second permanent magnet
16 varnish
17 shaft
18 air gap
19 wiring
20 driving wheel
21 coil
100 vehicle

The invention claimed is:
1. A rotor (1) for an electric machine (2), comprising:
a rotor body with a plurality of poles and a plurality of flux barriers (6.1, 6.2, 6.3, 6.4) formed in an interior of the rotor body;
at least one sensor (3) configured for detecting at least one condition variable of the rotor (1);
a signal processing unit (4) connected to the at least one sensor (3) and configured for generating measured data from the detected condition variable of the rotor (1) and for transmitting the measured data to a control device (5); and
at least one induction coil (7) that comprises at least one electrical conductor (8), the at least one induction coil (7) arranged in at least one flux barrier (6.1) of the plurality of flux barriers and configured for generating electrical energy from a leakage magnetic field in the at least one flux barrier (6.1) of the plurality of flux barriers during rotation of the rotor (1);

at least one permanent magnet (15.1), each of the at least one permanent magnet (15.1) arranged proximate a respective pole of the plurality of poles, wherein the at least one induction coil (7) is spaced apart from the at least one permanent magnet (15.1) on the rotor body.

2. The rotor (1) of claim 1, wherein the at least one induction coil (7) is configured for supplying one or both of the signal processing unit (4) and the at least one sensor (3) with electrical energy.

3. The rotor (1) of claim 1, wherein:
the at least one conductor (8) of the at least one induction coil (7) extends in a first direction in a first area (9.1) of the flux barrier (6.1); and
the at least one conductor (8) of the at least one induction coil (7) extends in a second direction in a second area (9.2) of the flux barrier (6.1), the second direction being opposite the first direction.

4. The rotor (1) of claim 1, wherein the at least one conductor (8) of the at least one induction coil (7) is wound around a carrier (10).

5. The rotor (1) of claim 4, wherein the carrier (10) is formed from a non-magnetizable material.

6. The rotor (1) of claim 4, wherein the carrier (10) is formed from one or more of a polymer material, a ceramic, a glass, and a resin.

7. The rotor (1) of claim 1, wherein the at least one conductor (8) of the at least one induction coil (7) is at least partially fixed with a varnish (16).

8. The rotor (1) of claim 1, wherein the at least one conductor (8) of the at least one induction coil (7) is at least partially fixed with an encapsulation (12).

9. The rotor (1) of claim 1, wherein the signal processing unit (4) is arranged on an end face of the rotor (1).

10. The rotor (1) of claim 1, wherein the at least one sensor (3) is integrated in the signal processing unit (4).

11. The rotor (1) of claim 1, wherein the at least one sensor (3) is arranged in the interior of the rotor (1).

12. The rotor (1) of claim 1, wherein a respective two of the permanent magnets (15.1, 15.2) are radially spaced apart and are arranged proximate each pole of the plurality of poles.

13. The rotor (1) of claim 1, wherein at least one of the plurality of flux barriers (6.1) is arranged proximate each pole of the plurality of poles.

14. An electric machine (2), comprising:
a control device (5) configured for open-loop control of the electric machine (2);
a stator (11); and
the rotor (1) of claim 1.

15. The rotor (1) of claim 1, wherein the plurality of flux barriers (6.1) are spaced apart from the at least one permanent magnet (15.1) on the rotor body.

\* \* \* \* \*